Oct. 27, 1953  J. ISENBERG  2,656,994
AIRCRAFT PEDAL DRIVE WITH POWER ACCUMULATOR
Filed May 22, 1952
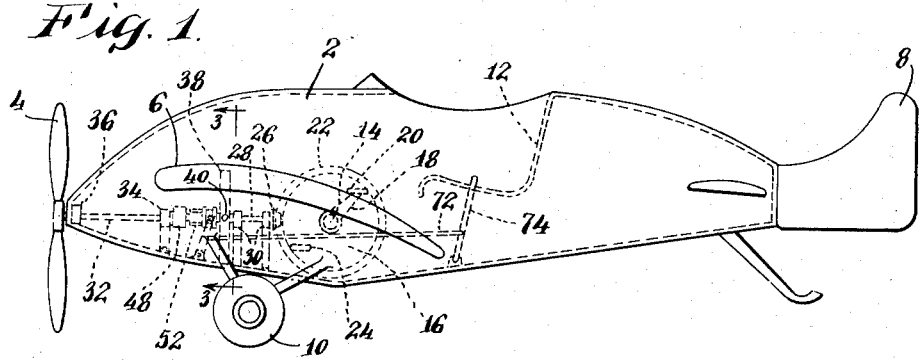
Fig. 1.
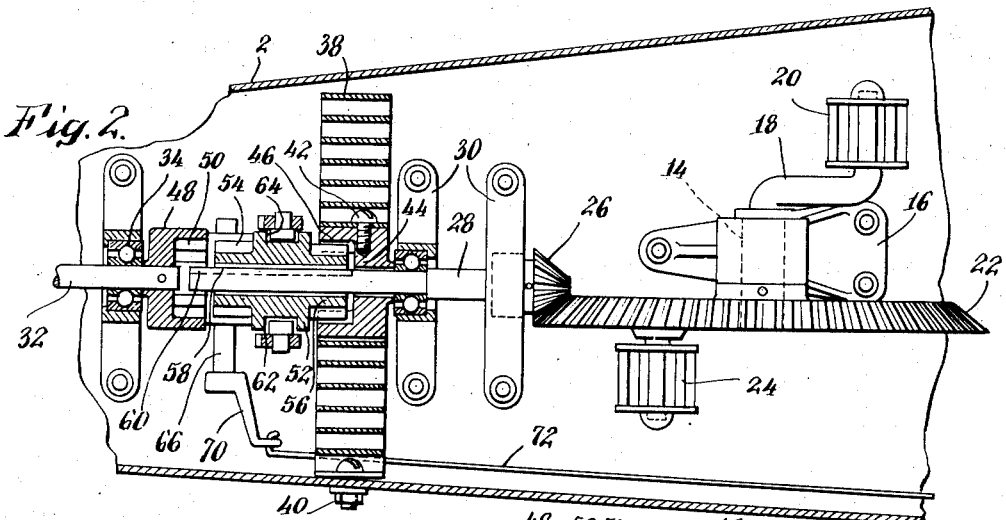
Fig. 2.
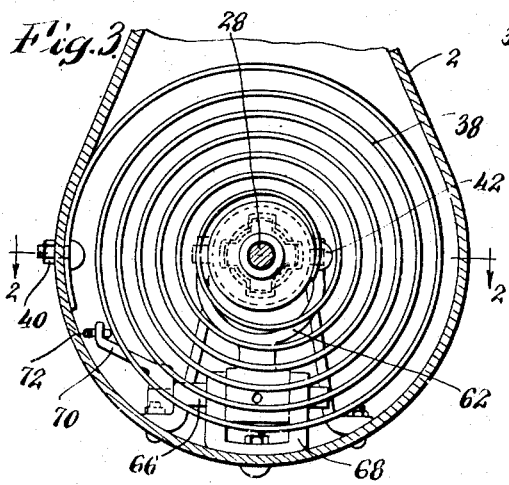
Fig. 3.
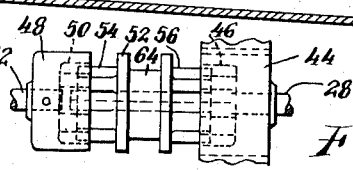
Fig. 4.
Fig. 5.
INVENTOR.
Joseph Isenberg
BY Henry J. S. Metzler
ATTORNEY.

Patented Oct. 27, 1953

2,656,994

UNITED STATES PATENT OFFICE 2,656,994

AIRCRAFT PEDAL DRIVE WITH POWER ACCUMULATOR

Joseph Isenberg, New York, N. Y.

Application May 22, 1952, Serial No. 289,319

1 Claim. (Cl. 244—64)

The present invention relates to improvements in propelling means for aircraft and, more specifically to new and improved auxiliary propelling means for aircraft of the glider type, although said means may be used also for other aircraft types.

It is well-known that a glider can remain aloft for considerable periods of time and can travel large distances without being propelled by an engine. Gliders usually are started by means of resilient ropes, catapults, engine-propelled aircraft, automobiles, or by any other outside power, and it is an object of the present invention to provide means for facilitating the starting of the flight of a glider and for reducing, or eliminating the necessity for, the outside power for starting a glider. This object of the present invention is attained generally, by providing the aircraft with a propeller driven by pedals actuated by the occupant of the aircraft and/or by a power accumulator, such as one or more springs, in which power has been stored by reversely operating said pedals prior to the beginning of the flight, so that at the start of the flight both the occupant's actuating the pedals as well as release of power from said power accumulator will drive the propeller at a high speed. This arrangement also permits the occupant of a glider while flying to support the movement of his aircraft by pedalling, or while the aircraft is being driven by the wind or normally operated as a glider to recharge the power accumulator, so that the power stored in the power accumulator will be available when needed.

Another object of the present invention is the provision of a device of the character described which is simple and inexpensive in construction, light in weight and well adapted for being installed in a small aircraft.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing a preferred form of the invention has been shown.

In said drawing:

Figure 1 is a side view of an aircraft with an embodiment of my invention installed;

Figure 2 is a fractional sectional view of the aircraft showing an enlarged embodiment of my invention partially as a top plan view and partially as in section on the line 2—2 of Fig. 3;

Fig. 3 is a fractional cross-sectional view on the line 3—3 of Fig. 2;

Fig. 4 is a detailed top view of a clutch in one position; and

Fig. 5 is a detailed top view of a clutch in another position.

Similar reference characters refer to similar parts throughout the several views.

In the drawing the numeral 2 denotes the fuselage of an aircraft, which has a propeller 4, wings 6, a tail 8, a landing gear 10, and a pilot seat 12. An axis 14 is rotatable in a bearing bracket 16, which is mounted within the fuselage 2, and has at one end a pedal arm 18 with a first pedal 20, while to its other end is secured a bevel gear wheel 22, from which a second pedal 24 is laterally extended. The pedals 20 and 24 are so located that they can be actuated effectively by the occupant of the seat 12. The wheel 22 drives a pinion 26, which is considerably smaller in diameter than the wheel 22 and is secured to, or made as a unit with, a first shaft 28, that is rotatably mounted in bearing brackets 30. A second shaft 32, which is rotatable in bearings 34 and 36, extends through the front end of the fuselage 2 and has secured to its outer extremity the propeller 4.

A spiral spring 38 has one of its ends secured to the fuselage 2 at 40, while its other end is secured at 42 to a first coupling member 44, which is rotatable on the shaft 28 and provided with claws 46. A second coupling member 48, which has claws 50, is secured to the shaft 32. A member 52 having claws 54 and 56 is axially shiftable on the shaft 28 and is keyed thereto by means of a rib 58, which engages a groove 60 (Fig. 2) in the shaft 28. The member 52 can be shifted by means of a bifurcated lever 62, which engages an annular groove 64 on the member 52. The lever 62 is secured to a bolt 66, which is rotatable in a bracket 68, that is secured to the fuselage 2. Another lever 70, secured to one end of the bolt 66 is connected by means of a rod 72 to an operating lever 74 near to seat 12. If the member 52 is in the position shown in Fig. 2, the shaft 28 is connected to the member 44 and is disconnected from the shaft 32, so that the occupant of the seat by pedalling reversely can wind the spring 38 without turning the propeller 4; if the member 52 is in the position shown in Fig. 4, the shaft 28 is connected to the member 44 as well as to the shaft 32, so that the maximum of power can be applied to the propeller 4 by permitting the spring 38 to unwind and by pedalling;

if the member 52 is in the position shown in Fig. 5, the shaft 28 is connected to the shaft 32 and is disconnected from the member 44, so that the propeller 4 can be turned by pedalling and without interfering with the spring 38.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent is:

A device of the character described comprising an axis rotatably mounted in an aircraft, a pedal arm carrying a first pedal being provided at one end of said axis, a first gear wheel secured to the other end of said axis, a second pedal being laterally extended from said first gear wheel, a second gear wheel being smaller in diameter than said first gear wheel and being driven by the latter, a first shaft rotatably mounted in the aircraft being parallel to the longitudinal axis of the aircraft and secured to said second gear wheel, a second shaft rotatable in the aircraft forming a longitudinal continuation of said first shaft, a spiral spring through whose center portion said first shaft is extended being windable within the aircraft and having one end secured to the inner side thereof, a propeller provided on the second shaft, and coupling means for alternatingly connecting the other end of said spring to said first shaft for winding the spring, or to said second shaft and said first shaft, or for connecting said first shaft to said second shaft.

JOSEPH ISENBERG.

References Cited in the file of this patent

UNITED STATES PATENTS

| Number | Name | Date |
|---|---|---|
| 378,364 | Gustafson | Feb. 21, 1888 |
| 2,012,104 | Loske | Aug. 20, 1935 |
| 2,112,014 | Cool | Mar. 22, 1938 |

FOREIGN PATENTS

| Number | Country | Date |
|---|---|---|
| 805,991 | France | Sept. 14, 1936 |